(12) United States Patent
Cho et al.

(10) Patent No.: US 10,216,971 B2
(45) Date of Patent: Feb. 26, 2019

(54) DISPLAY DEVICE INCLUDING SENSOR SCREEN AND METHOD OF DRIVING THE SAME

(71) Applicant: LG Display Co., Ltd., Seoul (KR)

(72) Inventors: Jiho Cho, Gyeonggi-do (KR); Kyoseop Choo, Gyeonggi-do (KR); Buyeol Lee, Gyeonggi-do (KR); Moonbong Song, Seoul (KR); Manhyeop Han, Seoul (KR)

(73) Assignee: LG Display Co., Ltd., Seoul (KR)

( * ) Notice: Subject to any disclaimer, the term of this patent is extended or adjusted under 35 U.S.C. 154(b) by 0 days.

(21) Appl. No.: 15/377,173

(22) Filed: Dec. 13, 2016

(65) Prior Publication Data

US 2017/0344787 A1 Nov. 30, 2017

(30) Foreign Application Priority Data

May 30, 2016 (KR) ........................ 10-2016-0066436

(51) Int. Cl.
| | | |
|---|---|---|
| G06F 3/041 | (2006.01) | |
| G06K 9/00 | (2006.01) | |
| G06F 3/044 | (2006.01) | |
| G06F 3/0488 | (2013.01) | |
| G09G 3/00 | (2006.01) | |

(52) U.S. Cl.
CPC ......... *G06K 9/00013* (2013.01); *G06F 3/044* (2013.01); *G06F 3/0416* (2013.01); *G06F 3/04886* (2013.01); *G06F 2203/0338* (2013.01); *G06F 2203/04106* (2013.01); *G09G 3/00* (2013.01)

(58) Field of Classification Search
CPC ...... G06F 3/0414; G06F 3/044; G06F 3/0412; G06F 3/0416; G06F 2203/04105; G06F 2203/04104; G09G 3/20; G09G 3/2092; G09G 2300/0426; G09G 2310/08
See application file for complete search history.

(56) References Cited

U.S. PATENT DOCUMENTS

| | | |
|---|---|---|
| 8,564,314 B2 | 10/2013 | Shaikh et al. |
| 2010/0194707 A1 | 8/2010 | Hotelling et al. |

(Continued)

FOREIGN PATENT DOCUMENTS

KR     10-1432988 B1     8/2014

OTHER PUBLICATIONS

Extended European Search Report dated Jul. 6, 2017, for corresponding European Patent Application No. 6207000.7.

*Primary Examiner* — Bryan Earles
(74) *Attorney, Agent, or Firm* — Morgan, Lewis & Bockius LLP

(57) ABSTRACT

A display device and a method of driving the same are disclosed. The display device includes a display panel including a first display area and a second display area that are adjacent to each other, and a first touch sensor disposed in the first display area, a sensor screen disposed on the display panel and including a fingerprint sensor and a second touch sensor at a location corresponding to the second display area of the display panel, a display touch integrated circuit (IC) configured to drive pixels of the first and second display areas and the first touch sensor, and a fingerprint touch IC configured to drive the fingerprint sensor in a portion of one frame period, in which the first touch sensor is not driven.

19 Claims, 15 Drawing Sheets

(56) References Cited

U.S. PATENT DOCUMENTS

| | | |
|---|---|---|
| 2011/0267298 A1 | 11/2011 | Erhart et al. |
| 2013/0135247 A1 | 5/2013 | Na et al. |
| 2013/0307818 A1 | 11/2013 | Pope et al. |
| 2014/0129843 A1 | 5/2014 | Shi et al. |
| 2014/0333328 A1* | 11/2014 | Nelson ............... G06F 3/044 324/663 |
| 2014/0354556 A1* | 12/2014 | Alameh ............. G06F 21/32 345/173 |
| 2014/0359756 A1 | 12/2014 | Alameh et al. |
| 2015/0145819 A1 | 5/2015 | Bae |
| 2015/0177884 A1* | 6/2015 | Han ................... G06F 3/044 345/174 |
| 2015/0346887 A1 | 12/2015 | Cho et al. |
| 2016/0232395 A1* | 8/2016 | Han ................... G06F 3/048 |
| 2017/0024597 A1* | 1/2017 | Cho .................... G06F 21/32 |
| 2017/0123566 A1* | 5/2017 | Noguchi ............. G06F 3/0416 |
| 2017/0205943 A1* | 7/2017 | Uchiyama ........... G06F 3/0416 |
| 2017/0220182 A1* | 8/2017 | Schwartz ............ G06F 3/0416 |

* cited by examiner

DISPLAY DEVICE INCLUDING SENSOR SCREEN AND METHOD OF DRIVING THE SAME

This application claims the benefit of Korean Patent Application No. 10-2016-0066436 filed on May 30, 2016, which is incorporated herein by reference for all purposes as if fully set forth herein.

BACKGROUND

Field of the Invention

The present disclosure relates to a display device including a sensor screen, and more particularly, to a display device including a sensor screen having a touch recognition function and a fingerprint recognition function and a method of driving the display device.

Discussion of the Related Art

With the development of computer technology, computer based systems, that can be applied to various utilities such as notebook computers, tablet personal computers (PCs), smart phones, personal digital assistants (PDAs), automated teller machines (ATMs), and information systems, have been developed. In general, computer based systems store various data including private information such as secret business information and personal information related to private affairs. Thus, strong security mechanisms are typically desired to protect such information.

To this end, fingerprint sensors have been developed to strengthen security by performing registration or certification of systems using fingerprints of human beings. The fingerprint sensor is a sensor capable of sensing fingerprints of human beings. A fingerprint sensor can be classified into an optical fingerprint sensor and a capacitive fingerprint sensor. Because the optical fingerprint sensor has to perform a scan operation using a light source, problems in this field concern a limitation in a reduction in size due to the use of light source and a rise in the product cost due to the use of expensive light source.

The capacitive fingerprint sensor utilizes a difference of electric charges charged between ridges and valleys of the fingerprint contacted thereto. U.S. Patent Publication No. 2013/0307818 published on Nov. 21, 2013 and entitled "Capacitive Sensor Packaging" describes a capacitive fingerprint sensor of a related art.

The published capacitive fingerprint sensor is configured as an assembly form coupled with a particular push button. The capacitive fingerprint sensor includes a silicon wafer, on which a circuit for measuring a capacitance between a fingerprint (ridges and valleys) and a capacitive plate is printed. In general, the capacitive fingerprint sensor described in US Patent Publication No. 2013/0307818 may need a high resolution sensor array and an integrated circuit (IC) for the fingerprint recognition processing because the fingerprint's ridges and valleys have a very minute size of about 300 μm to 500 μm. To this end, the capacitive fingerprint sensor utilizes the silicon wafer for integrating the IC with the sensor array. However, when the IC and the high resolution sensor array are integrated using the silicon wafer, the small-sized packaged fingerprint sensor has to be embedded in a push button (e.g., a home key of a smart phone) or separately attached to a back surface of the push button because the silicon wafer is opaque and has a limit to an increase in size. Thus, an assembly configuration for coupling the fingerprint sensor with the push button is necessary, thereby leading to an increase in size (due to a non-display area and a thickness) and a rise in the product cost.

To address the above-described problems, a technology has been developed to use a touch sensor screen as a fingerprint identification area. The technology is described in U.S. Pat. No. 8,564,314 issued on Oct. 22, 2013 and entitled "Capacitive touch sensor for identifying a fingerprint" and Korean Patent No. 10-1432988 issued on Aug. 18, 2014 and entitled "Fingerprint recognition integrated type capacitive touch screen".

FIG. 1 is a plan view schematically illustrating an arrangement of driving electrodes and sensing electrodes of a capacitive sensing panel illustrated in U.S. Pat. No. 8,564,314. FIG. 2 is a plan view illustrating configuration of a fingerprint recognition integrated type capacitive touch screen illustrated in Korean Patent No. 10-1432988.

Referring to FIG. 1, a capacitive touch sensor for identifying a fingerprint includes a touch sensor 403 including touch driving electrodes 401($x$) and touch sensing electrodes 401($y$) and a fingerprint sensor 405 including fingerprint driving electrodes 405($x$) and fingerprint sensing electrodes 405($y$). In the capacitive touch sensor for identifying the fingerprint, because the fingerprint sensor 405 is separately disposed in a portion of a screen area, problems posed may include a non-touch of the fingerprint sensor 405 or a reduction in a touch performance around the fingerprint sensor 405.

Referring to FIG. 2, a fingerprint recognition integrated type capacitive touch screen includes a touch panel 110, electrode connection lines 120, and a touch controller 130. The touch panel 110 includes fine channels 113 formed by a combination of first channel electrodes 111 (one of Tx and Rx) and second channel electrodes 112 (the other of Tx and Rx) crossing each other. The fine channels 113 are configured such that the fine channels 113 of a remaining area except an area of fingerprint sensors 114 form a plurality of groups each serving as a touch group channel 115 for sensing a touch signal, and the fine channels 113 corresponding to the area of the fingerprint sensors 114 each serve as a fingerprint recognition channel 116. However, this fingerprint recognition integrated type capacitive touch screen may greatly increase a mutual capacitance because of the fine channels 113 serving as the touch group channels 115. An increase in the mutual capacitance may lead to a reduction in sensitivity of the fingerprint sensor 114.

The sensitivity of the fingerprint sensor is affected by an external noise as well as the mutual capacitance. The external noise includes a touch noise generated when touch sensors are driven, and a display noise generated when pixels of a display panel are driven. An increase in the external noise may reduce the sensitivity of the fingerprint sensor.

SUMMARY

Accordingly, the present invention is directed to a display device including sensor screen and method of driving the same that substantially obviates one or more of the problems due to limitations and disadvantages of the related art.

An object of the present disclosure is to provide a display device including a sensor screen capable of increasing sensitivity of a fingerprint sensor and a method of driving the same.

Additional features and advantages of the invention will be set forth in the description that follows, and in part will be apparent from the description, or may be learned by practice of the invention. The objectives and other advantages of the invention will be realized and attained by the structure particularly pointed out in the written description and claims hereof as well as the appended drawings.

To achieve these and other advantages and in accordance with the purpose of the present invention, as embodied and broadly described, a display device comprises a display panel including a first display area and a second display area that are adjacent to each other, the display panel including a first touch sensor disposed in the first display area; a sensor screen disposed on the display panel, the sensor screen including a fingerprint sensor and a second touch sensor at a location corresponding to the second display area of the display panel; a display touch integrated circuit (IC) configured to drive pixels of the first and second display areas and the first touch sensor; and a fingerprint touch IC configured to drive the fingerprint sensor in a portion of one frame period, in which the first touch sensor is not driven.

In another aspect, a method of driving a display device, including a display panel including a first display area and a second display area, that are adjacent to each other, and a first touch sensor disposed in the first display area and a sensor screen disposed on the display panel and including a fingerprint sensor and a second touch sensor at a location corresponding to the second display area of the display panel, comprises driving pixels of the first and second display areas to write input image data to the display panel; driving the first touch sensor to obtain a first touch sensing value from the first touch sensor; and driving the fingerprint sensor in a portion of one frame period, in which the first touch sensor is not driven, to obtain a fingerprint sensing value.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention. In the drawings.

DETAILED DESCRIPTION

Reference will now be made in detail to embodiments of the invention, examples of which are illustrated in the accompanying drawings. Wherever possible, the same reference numbers will be used throughout the drawings to refer to the same or like parts. Detailed description of known arts will be omitted if it is determined that the arts can mislead the embodiments of the invention. Names of the respective elements used in the following explanations are selected only for convenience of writing the specification and may be thus different from those used in actual products.

In the following description, "first display area" is a main display part of a display device and means "a main display area" capable of sensing a touch; "second display area" is an auxiliary display part, on which a selection icon, etc. are displayed, and means "a sub-display area" capable of sensing a fingerprint input and a touch input; and "fingerprint touch area" means an area that is positioned in the second display area and is able to perform both fingerprint recognition and touch recognition.

Further, "common electrode" means a touch electrode serving as common electrode that serves as a driving electrode and a touch sensing electrode of a touch sensor during a touch period, in which a touch input of the first display area of the display device is sensed, and serves as a common electrode during a display period, in which image data is written to the first display area.

Further, "display touch integrated circuit (IC)" means an integrated IC of a source IC for writing image data to the first display area of the display device and a touch IC for sensing a touch input of the first display area.

Further, "fingerprint touch IC" means an integrated IC of a touch IC for sensing a touch input of a sensor screen and a fingerprint IC for sensing a fingerprint input of the sensor screen.

Further, "fingerprint touch sensor" is interpreted to include a touch sensor and a fingerprint sensor disposed on the sensor screen, and "fingerprint sensor" is interpreted to be able to perform both fingerprint recognition and touch recognition.

Figure 1:
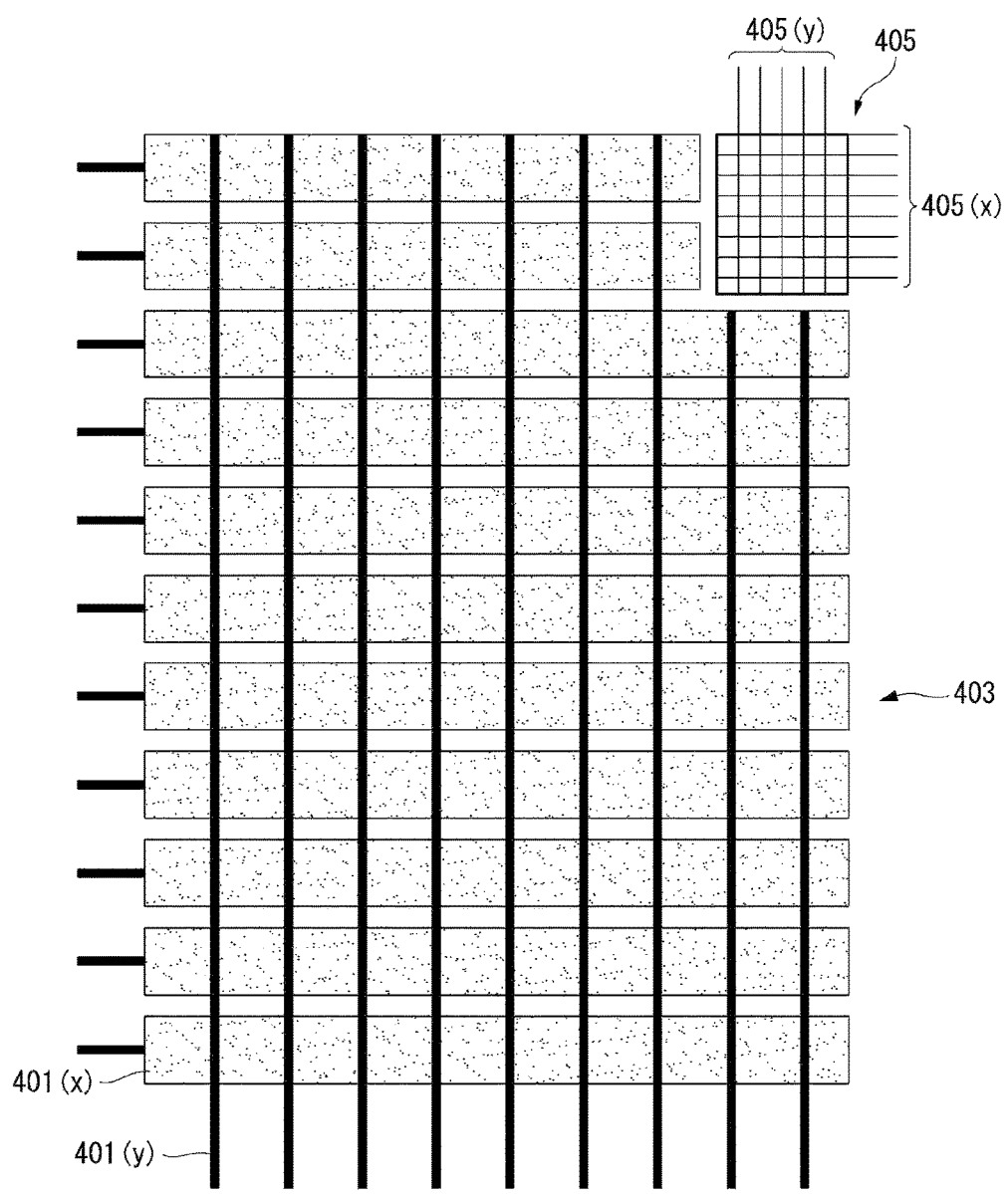
FIG. 1 is a plan view schematically illustrating an arrangement of driving electrodes and sensing electrodes of a capacitive sensing panel of a related art.
Figure 2:
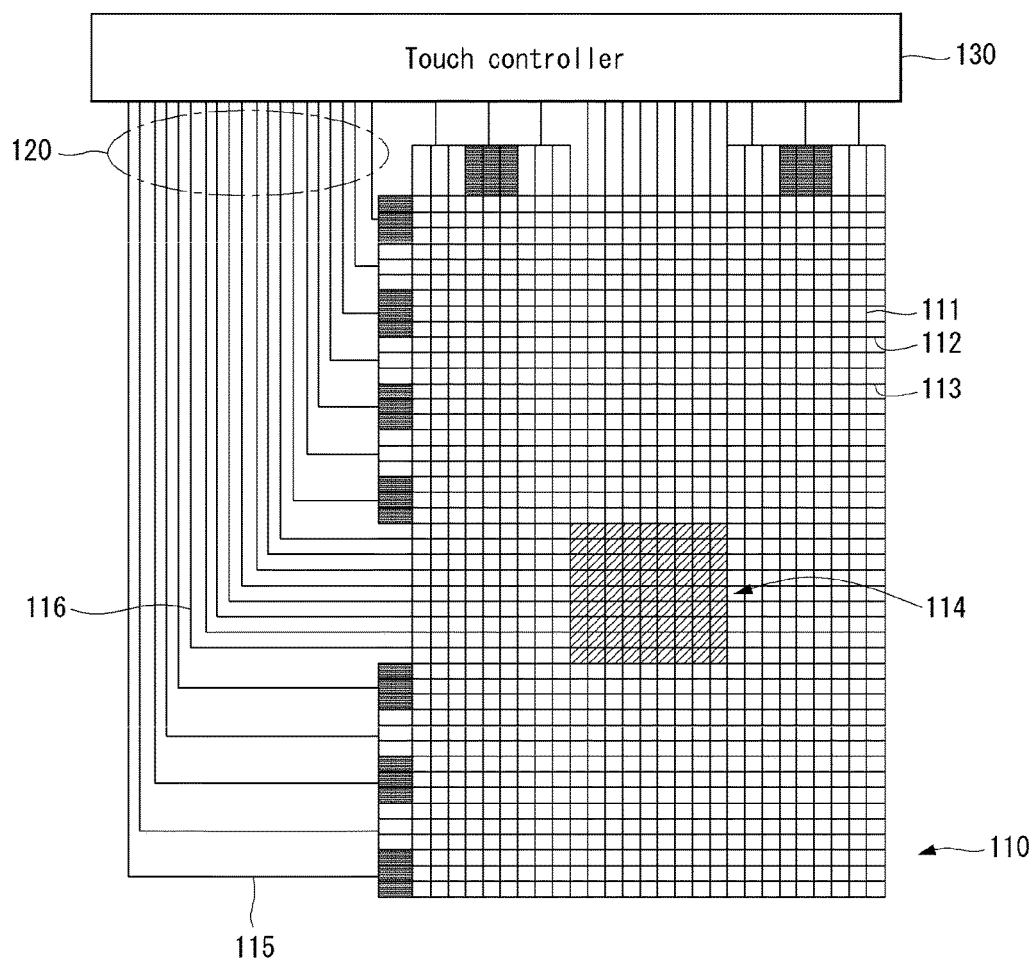
FIG. 2 is a plan view illustrating configuration of a fingerprint recognition integrated type capacitive touch screen of a related art.
Figure 3:
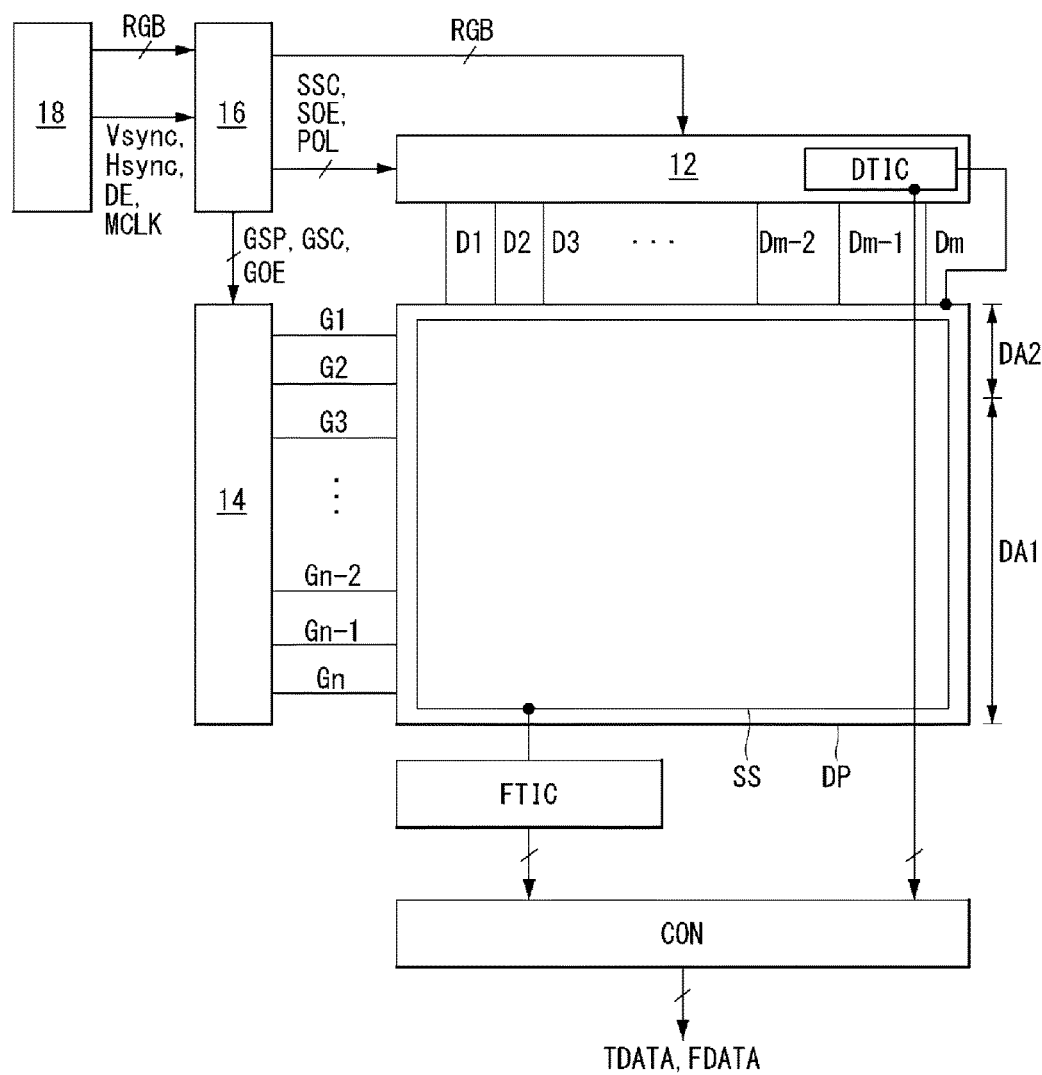
FIG. 3 is a block diagram of a display device including a sensor screen according to an example embodiment.
Figure 4:
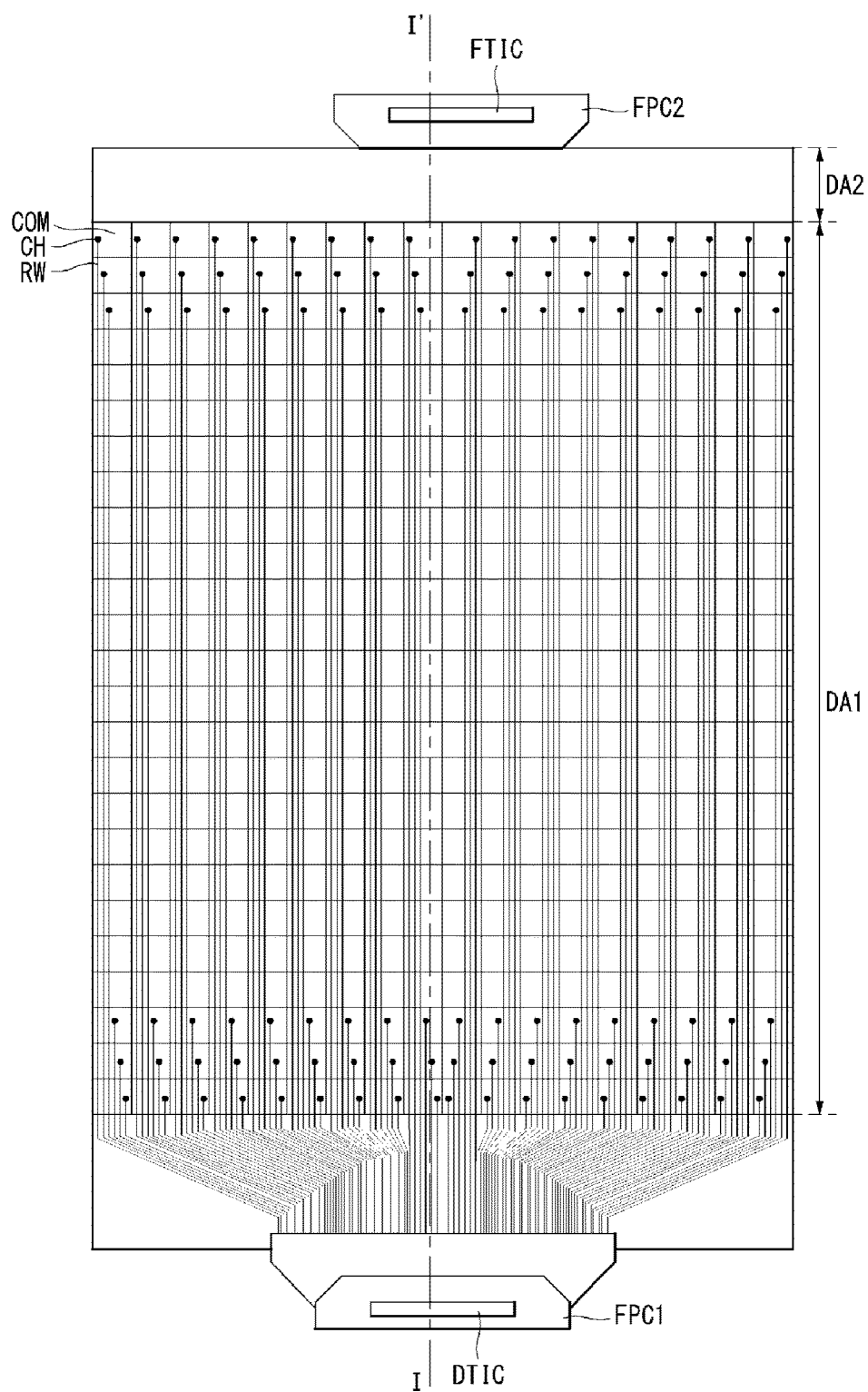
FIG. 4 is a plan view of a display device including a sensor screen according to an example embodiment.
Figure 5:
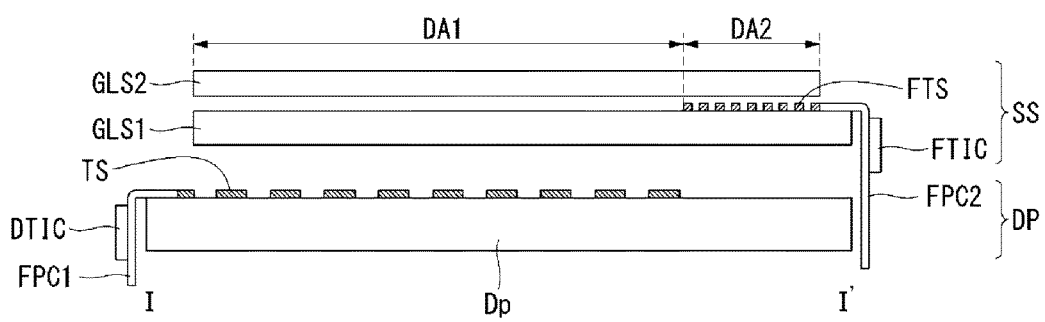
FIG. 5 is a cross-sectional view taken along line I-I' of FIG. 4.
Figure 6:
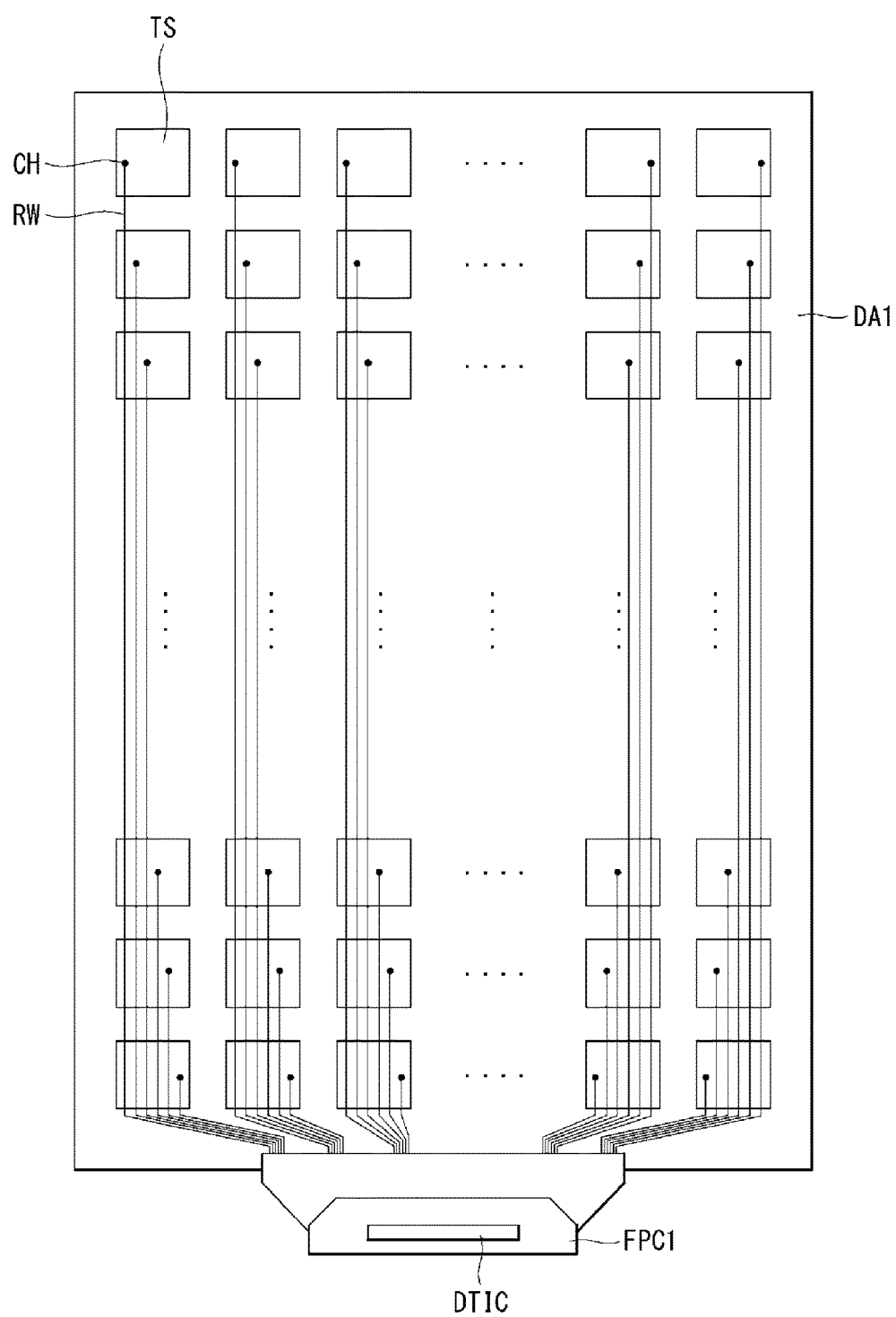
FIG. 6 is a plan view of a first touch sensor shown in FIG. 5.
Figure 7:
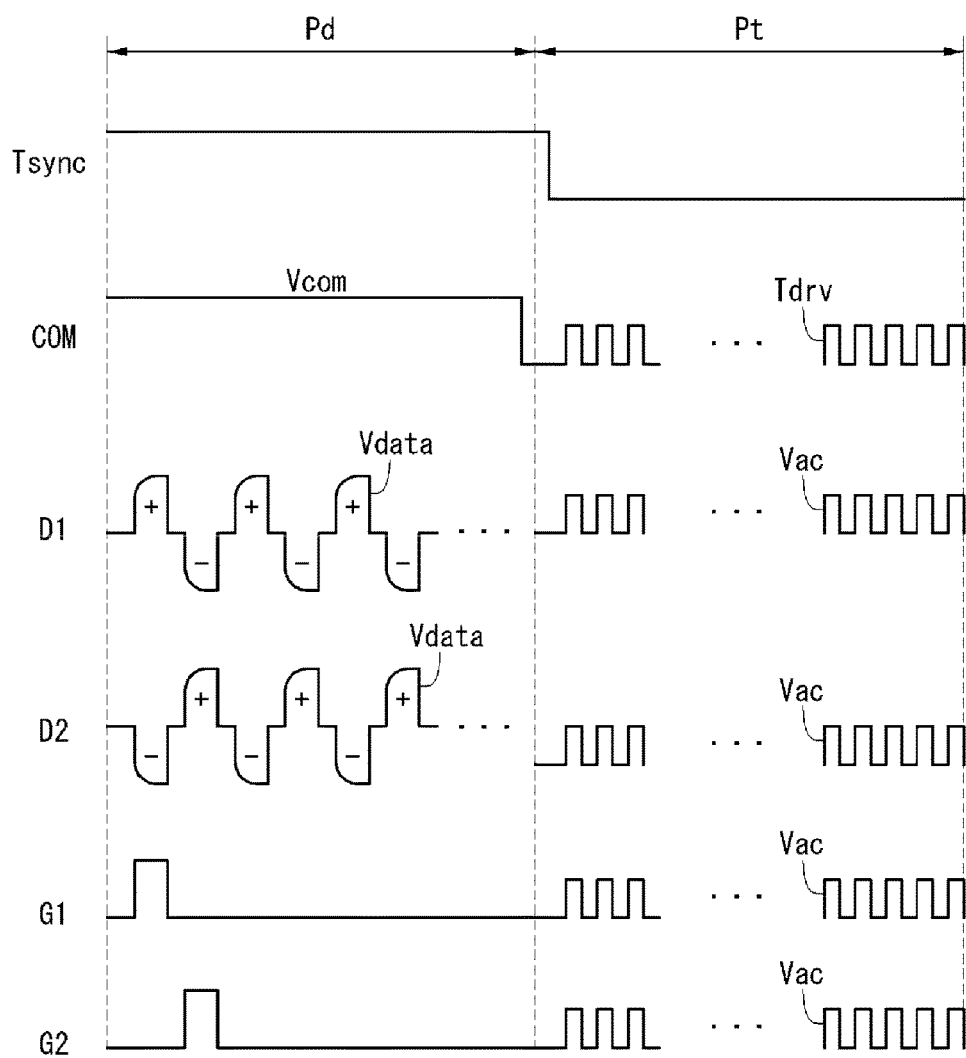
FIG. 7 is a waveform diagram illustrating a time-division drive of a pixel and a first touch sensor shown in FIG. 5.
Figure 8:
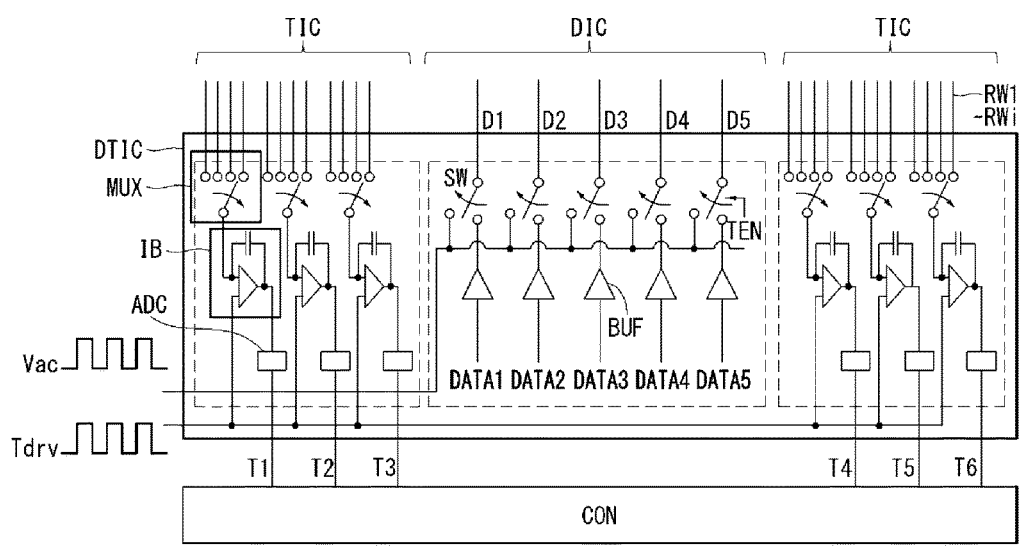
FIG. 8 illustrates an inner configuration of a display touch integrated circuit (IC) shown in FIG. 5.

FIG. 3 is a block diagram of a display device including a sensor screen according to an example embodiment. FIG. 4 is a plan view of a display device including a sensor screen according to an example embodiment. FIG. 5 is a cross-sectional view taken along line I-I' of FIG. 4. FIG. 6 is a plan view of a first touch sensor shown in FIG. 5. FIG. 7 is a waveform diagram illustrating a time-division drive of a pixel and a first touch sensor shown in FIG. 5. FIG. 8 illustrates an inner configuration of a display touch integrated circuit (IC) shown in FIG. 5.

Referring to FIGS. 3 to 8, a display device including a sensor screen according to an example embodiment includes a display panel DP, a sensor screen SS disposed on the display panel DP, a display touch IC DTIC connected to the display panel DP, a fingerprint touch IC FTIC connected to the sensor screen SS, a sensor controller CON for processing an signal input from the display touch IC DTIC and the fingerprint touch IC FTIC, a display driving circuit (12, 14, and 16) for writing input image data RGB to the display panel DP, and a host system 18.

The display panel DP may use a display panel of a flat panel display, such as a liquid crystal display (LCD), a field emission display (FED), a plasma display panel (PDP), an organic light emitting diode (OLED) display, and an electrophoresis display (EPD). In the following description, embodiments will be described using a liquid crystal display panel of a liquid crystal display as an example of the display panel DP. Other display panels may be used.

The display panel DP includes a liquid crystal layer between an upper substrate and a lower substrate. Liquid crystal molecules of the liquid crystal layer are driven by an electric field generated by a potential difference between a data voltage of an input image applied to a pixel electrode (not shown) and a common voltage applied to a common electrode COM. A pixel array of the display panel DP includes pixels defined by data lines D1 to Dm and gate lines G1 to Gn, where m and n are a positive integer, first touch sensors TS divided from the common electrode COM, and routing wires RW connected to the first touch sensors TS. Each of the common electrodes COM separated from the pixel electrodes may be made of a transparent conductive material, for example, indium tin oxide (ITO).

Black matrixes, color filters, etc. may be formed on the upper substrate of the display panel DP. The lower substrate of the display panel DP may be configured in a COT (color filter on TFT) structure. In this instance, the color filters may be formed on the lower substrate of the display panel DP. Polarizing plates are respectively attached to the upper substrate and the lower substrate of the display panel DP. Alignment layers for setting a pre-tilt angle of liquid crystals are respectively formed on the inner surfaces contacting the liquid crystals in the upper substrate and the lower substrate of the display panel DP. A column spacer may be formed between the upper substrate and the lower substrate of the display panel DP to keep a cell gap of the liquid crystal layer constant.

A backlight unit may be disposed under a back surface of the display panel DP. The backlight unit may be implemented as one of an edge type backlight unit and a direct type backlight unit and may irradiate light onto the display panel DP. The display panel DP may be implemented in any known mode including a twisted nematic (TN) mode, a vertical alignment (VA) mode, an in-plane switching (IPS) mode, a fringe field switching (FFS) mode, etc.

The display panel DP includes a first display area DA1 and a second display area DA2 that are positioned adjacent to each other.

A first flexible circuit board FPC1, on which the display touch IC DTIC for a display drive and a touch recognition of the first display area DA1 is mounted, is attached to the outside of the first display area DA1. A second flexible circuit board FPC2, on which the fingerprint touch IC FTIC for a fingerprint recognition and a touch recognition of the second display area DA2 is mounted, is attached to the outside of the second display area DA2.

The display panel DP includes the first touch sensors TS capable of sensing a touch input of the first display area DA1. For example, the first touch sensor TS may be configured as a self-capacitive touch sensor or a mutual capacitance touch sensor by patterning the common electrode COM of the display panel DP. The first touch sensor TS supplies the common voltage to the pixels of the display panel DP during a display period and receives a touch driving signal to sense a touch input during a touch period. FIG. 4 illustrates an example where the routing wires RW are respectively connected to the divided common electrodes COM of the display panel DP to form the first touch sensor TS implemented as the self-capacitive touch sensor. The self-capacitive touch sensor serves as a common electrode during a display period of one frame period and serves as a touch electrode during a touch period of one frame period.

Embodiments are not limited to the first touch sensor TS implemented as the self-capacitive touch sensor in the first display area DA1. For example, embodiments may use the first touch sensor TS configured as a mutual capacitance touch sensor by dividing the common electrode COM of the display panel DP in horizontal and vertical directions and connecting the divided common electrodes to one another in the horizontal and vertical directions. Since such a touch sensor integrated (or embedded) type display device is already known in U.S. Patent Publication No. 2010/0194707 published on Aug. 5, 2010, etc., a further description may be briefly made or may be entirely omitted.

The first touch sensor TS is connected to the display touch IC DTIC. The display touch IC DTIC is an integrated IC of a source IC for writing image data RGB to the first display area DA1 and a touch IC for sensing a touch input of the first display area DA1. The display touch IC DTIC senses a change amount of charges of the first touch sensor TS in accordance with a touch input in a touch period of one frame period to generate first touch sensing data and supplies the first touch sensing data to the sensor controller CON. The sensor controller CON analyzes the first touch sensing data, determines a touch input of a conductive material, for example, a finger (or a stylus pen), and calculates first touch information TDATA of a position of the touch input using a predetermined coordinate extraction algorithm. The first touch information TDATA of the touch input position is transmitted to the host system 18.

The sensor screen SS is disposed on the display panel DP and includes a fingerprint touch sensor FTS formed at a location corresponding to the second display area DA2 of the display panel DP.

The sensor screen SS includes a first transparent substrate GLS1 and a second transparent substrate GLS2 that are sequentially disposed on the display panel DP. The first and second transparent substrates GLS1 and GLS2 may be made of a transparent material, for example, tempered glass or hard-coated high-hardness plastic, etc.

The first transparent substrate GLS1 may have a first thickness, and the second transparent substrate GLS2 may have a second thickness less than the first thickness. The second thickness of the second transparent substrate GLS2 may be set to several μm to about 0.3 mm in consideration of rigidity and a fingerprint recognition rate. When the second thickness of the second transparent substrate GLS2 is less than several μm, rigidity of the second transparent substrate GLS2 may not be sufficiently secured. Hence, a fingerprint sensor formed under the second transparent substrate GLS2 may not be sufficiently protected. When the second thickness of the second transparent substrate GLS2 exceeds 0.3 mm, the fingerprint recognition rate and the sensitivity may decrease.

The rigidity of the display panel DP when the two transparent substrates GLS1 and GLS2 are disposed on the display panel DP may further increase, compared to when one transparent substrate having the same thickness as a sum of the thicknesses of the two transparent substrates GLS1 and GLS2 is disposed on the display panel DP. Hence, the display panel DP can be protected from an external impact. Further, because the fingerprint touch sensor FTS is disposed between the two transparent substrates GLS1 and GLS2, a distance between the finger and the fingerprint touch sensor FTS may decrease, compared to when one transparent substrate is used. Hence, the sensitivity and the fingerprint recognition rate may increase.

The first and second transparent substrates GLS2 and GLS2 may be attached to each other using a transparent material having a good adhesive strength and durability, for example, an optical clear adhesive (OCA) or an optical clear resin (OCR). The first transparent substrate GLS1 and the display panel DP may also be attached to each other using the OCA or the OCR.

The fingerprint touch sensor FTS is disposed on the first transparent substrate GLS1 opposite the second transparent substrate GLS2 at a location corresponding to the second display area DA2 of the display panel DP.

The fingerprint touch sensor FTS may include a fingerprint sensor disposed in a portion of the sensor screen SS corresponding to the second display area DA2 of the display panel DP and a plurality of second touch sensors disposed in a remaining portion of the sensor screen SS corresponding to the second display area DA2 of the display panel DP. The fingerprint sensor may be used as a touch sensor. Configuration of the fingerprint touch sensor FTS is described in detail with reference to FIGS. 9 and 10.

The fingerprint touch sensor FTS is connected to the fingerprint touch IC FTIC. The fingerprint touch IC FTIC is an integrated IC of a touch IC for sensing a touch input of the sensor screen SS and a fingerprint IC for sensing a fingerprint input of the sensor screen SS. The fingerprint touch IC FTIC drives the fingerprint touch sensor FTS in a period, in which the first touch sensor TS is not driven, so as to minimize mixing of a noise resulting from a drive of the first touch sensor TS. To this end, the fingerprint touch IC FTIC may drive the fingerprint touch sensor FTS in a display period in which a sensing operation of the first touch sensor TS is stopped. Further, the fingerprint touch IC FTIC may drive the fingerprint sensor included in the fingerprint touch sensor FTS in a separate fingerprint period in which the sensing operation of the first touch sensor TS is stopped. In this instance, the fingerprint touch IC FTIC may drive the second touch sensor included in the fingerprint touch sensor FTS in the display period in which the sensing operation of the first touch sensor TS is stopped.

The fingerprint touch IC FTIC senses a change amount of charges of the fingerprint sensor in accordance with a fingerprint input in a display period or a fingerprint period of one frame period to generate fingerprint sensing data and supplies the fingerprint sensing data to the sensor controller CON. The sensor controller CON analyzes the fingerprint sensing data and generates fingerprint information FDATA according to a touch input of a finger. The fingerprint information FDATA is transmitted to the host system 18.

The fingerprint touch IC FTIC senses a change amount of charges of the second touch sensor in accordance with a touch input in a display period of one frame period to generate second touch sensing data and supplies the second touch sensing data to the sensor controller CON. The sensor controller CON analyzes the second touch sensing data, determines a touch input of a conductive material, for example, the finger (or the stylus pen), and calculates second touch information TDATA of a position of the touch input using a predetermined coordinate extraction algorithm. The second touch information TDATA of the touch input position is transmitted to the host system 18.

To drive the display panel DP in which the first touch sensors TS are embedded, one frame period of the display device, as shown in FIG. 7, may be time-divided into at least one display period Pd and at least one touch period Pt. The display driving circuit (12, 14, and 16) and the display touch IC DTIC are synchronized with each other in response to a touch sync signal Tsync. A first logic level of the touch sync signal Tsync may define the display period Pd, and a second logic level of the touch sync signal Tsync may define the touch period Pt. As shown in the example of FIG. 7, the first logic level may be a high logic level, and the second logic level may be a low logic level, and vice versa, although embodiments are not limited thereto.

The display driving circuit (12, 14, and 16) writes data RGB of an input image to the pixels during the display period Pd. The pixels hold a data voltage Vdata, which has been charged to the pixels during the display period Pd, because thin film transistors (TFTs) of the pixels are in an off-state during the touch period Pt. The display driving circuit (12, 14, and 16) supplies an AC signal Vac having the same phase and the same amplitude as a touch driving signal Tdrv to the signal lines D1 to Dm and G1 to Gn to minimize a parasitic capacitance between the first touch sensors TS and the signal lines D1 to Dm and G1 to Gn connected to the pixels during the touch period Pt.

The display driving circuit (12, 14, and 16) includes a data driving circuit 12, a gate driving circuit 14, and a timing controller 16.

The data driving circuit 12 converts the data RGB of the input image, that is received from the timing controller 16 during the display period Pd, into positive and negative analog gamma compensation voltages and outputs the data voltage. The data driving circuit 12 then supplies the data voltage to the data lines D1 to Dm. The data driving circuit 12 supplies the AC signal Vac, having the same phase and the same amplitude as the touch driving signal Tdrv applied to the first touch sensors TS, to the data lines D1 to Dm during the touch period Pt, thereby minimizing a parasitic capacitance between the first touch sensors TS and the data lines D1 to Dm. This is because voltages at both ends of the parasitic capacitance simultaneously change, and an amount of charges charged to the parasitic capacitance decreases as a voltage difference between both ends of the parasitic capacitance decreases.

The data driving circuit 12 includes at least one display touch IC DTIC. As shown in FIG. 8, the display touch IC DTIC includes a source IC DIC for writing the input image data RGB to the first and second display areas DA1 and DA2 and a touch IC TIC for sensing a touch input of the first display area DA1.

The touch IC TIC included in the display touch IC DTIC includes a multiplexer MUX, an integrator IB, and an analog-to-digital converter ADC. During the touch period Pt, the touch IC TIC supplies the touch driving signal Tdrv to the first touch sensors TS and accumulates charges received from the first touch sensors TS. The touch IC TIC converts an accumulated signal into a digital signal to generate first touch sensing data T1 to T6 and then outputs the first touch sensing data T1 to T6 to the sensor controller CON. During the display period Pd, routing wires RW1 to RWi are disconnected from the multiplexer MUX and are connected to a common voltage input terminal (not shown). Thus, during the display period Pd, the common voltage is applied to the first touch sensors TS.

The source IC DIC included in the display touch IC DTIC includes output control switches SW that are turned on and off in response to the touch sync signal Tsync. The output control switches SW supply the AC signal Vac to the data lines D1 to D5 during the touch period Pt and supplies data voltages DATA1 to DATA5 to the data lines D1 to D5 during the display period Pd.

During the display period Pd, the gate driving circuit 14 sequentially supplies a gate pulse (or a scan pulse) synchronized with the data voltage to the gate lines G1 to Gn and selects pixel lines of the display panel DP to which the data voltage is applied. During the touch period Pt, the gate driving circuit 14 supplies the AC signal Vac, having the same phase and the same amplitude as the touch driving signal Tdrv applied to the first touch sensors TS, to the gate lines G1 to Gn, thereby minimizing a parasitic capacitance between the first touch sensors TS and the gate lines G1 to Gn.

The timing controller 16 receives timing signals, such as a vertical sync signal Vsync, a horizontal sync signal Hsync, and a data enable signal DE, from the host system 18 and controls operation timings of the data driving circuit 12 and the gate driving circuit 14. The timing controller 16 generates a scan timing control signal GDC to control the operation timing of the gate driving circuit 14 and generates a data timing control signal SDC to control the operation timing of the data driving circuit 12.

The timing controller 16 generates the touch sync signal Tsync and may define the display period Pd and the touch period Pt in one frame period using the touch sync signal Tsync. Further, the timing controller 16 generates the touch sync signal Tsync and may define a fingerprint period Pf in addition to the display period Pd and the touch period Pt in one frame period using the touch sync signal Tsync.

The host system 18 may be implemented as one of a phone system, a television system, a set-top box, a navigation system, a DVD player, a Blu-ray player, a personal computer (PC), and a home theater system. The host system 18 includes a system-on chip (SoC), in which a scaler is embedded, and converts the data RGB of the input image into a format suitable for a resolution of the display panel DP. The host system 18 transmits the data RGB of the input image and the timing signals Vsync, Hsync, and DE to the timing controller 16. The host system 18 may execute an application associated with the first and second touch informations TDATA input from the display touch IC DTIC and the fingerprint touch IC FTIC. Further, the host system 18 may execute an application associated with the fingerprint information FDATA input from the fingerprint touch IC FTIC.

Figure 9:
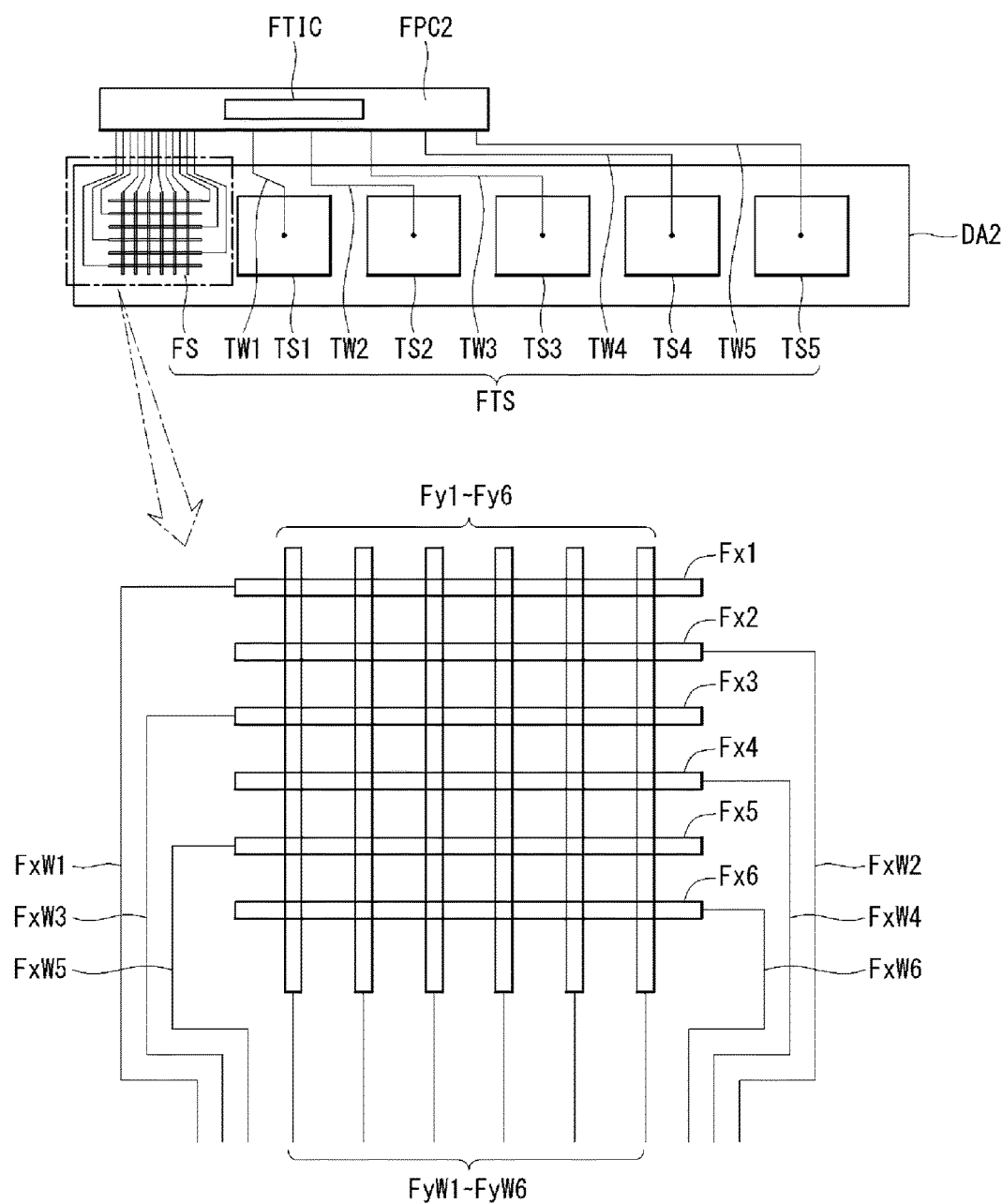
FIG. 9 is a plan view illustrating a first example of a second touch sensor and a fingerprint sensor shown in FIG. 5.
Figure 10:
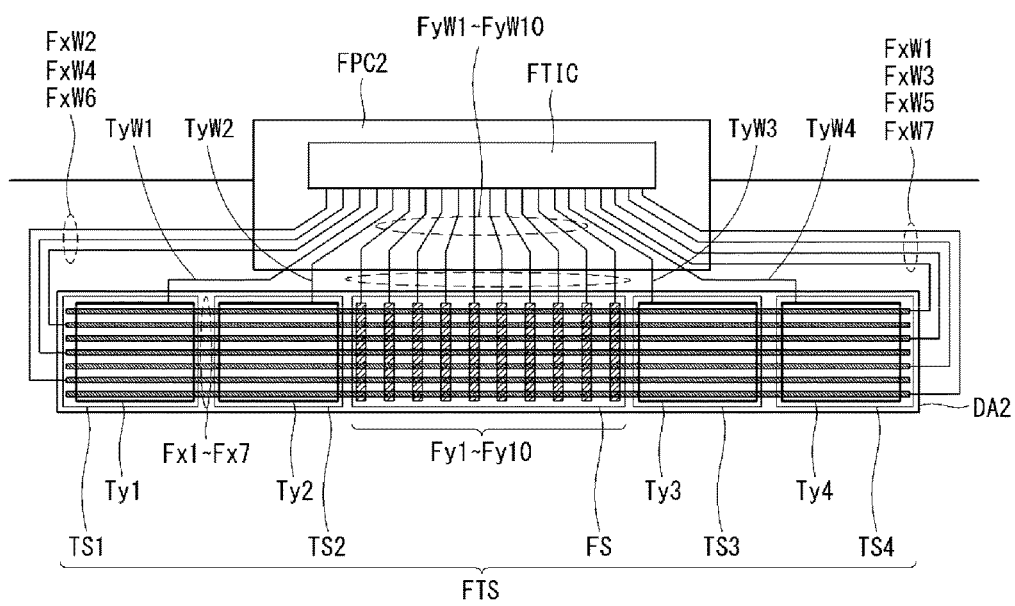
FIG. 10 is a plan view illustrating a second example of a second touch sensor and a fingerprint sensor shown in FIG. 5.

FIGS. 9 and 10 are plan views illustrating a first example and a second example of the second touch sensor and the fingerprint sensor shown in FIG. 5.

Referring to FIG. 9, the fingerprint touch sensor FTS includes a plurality of second touch sensors TS1 to TS5 and at least one fingerprint sensor FS. For example, FIG. 9 illustrates one fingerprint sensor FS.

Each of the second touch sensors TS1 to TS5 may be configured as a touch electrode having, for example, a rectangular shape. The second touch sensors TS1 to TS5 are connected to the fingerprint touch IC FTIC mounted on the second flexible circuit board FPC2 through touch routing wires TW1 to TW5.

The fingerprint sensor FS includes a plurality of first fingerprint touch electrodes Fx1 to Fx6 and a plurality of second fingerprint touch electrodes Fy1 to Fy6 that are disposed to intersect each other. The plurality of first fingerprint touch electrodes Fx1 to Fx6 and the plurality of second fingerprint touch electrodes Fy1 to Fy6 are electrically insulated from each other by insulating patterns (not shown) or an insulating layer (not shown). The first fingerprint touch electrodes Fx1 to Fx6 are connected to the fingerprint touch IC FTIC mounted on the second flexible circuit board FPC2 through a plurality of first fingerprint routing wires FxW1 to FxW6. The second fingerprint touch electrodes Fy1 to Fy6 are connected to the fingerprint touch IC FTIC mounted on the second flexible circuit board FPC2 through a plurality of second fingerprint routing wires FyW1 to FyW6.

The fingerprint touch IC FTIC supplies a driving pulse to the first fingerprint touch electrodes Fx1 to Fx6 and senses the second fingerprint touch electrodes Fy1 to Fy6, thereby sensing changes in a capacitance resulting from a touch input. Hence, when a touch input using a finger is performed on a formation area of the fingerprint sensor FS, the fingerprint touch IC FTIC may recognize the touch input. Further, the fingerprint touch IC FTIC may sense changes in a capacitance between ridges and valleys of a fingerprint resulting from the touch input and thus may recognize a fingerprint of a user. The fingerprint touch IC FTIC may apply the touch driving signal to the second touch sensors TS1 to TS5 and sense changes in a capacitance resulting from a touch input.

The fingerprint touch sensor FTS according to an example of FIG. 9 includes one fingerprint sensor and a plurality of touch sensors in a portion of the sensor screen SS corresponding to the second display area DA2 of the display panel DP, by way of example. Embodiments are not limited thereto. The fingerprint sensor and the touch sensor may be properly adjusted in position and number, if necessary or desired.

Referring to FIG. 10, the fingerprint touch sensor FTS includes a plurality of second touch sensors TS1 to TS4 and a fingerprint sensor FS.

The second touch sensors TS1 to TS4 include a plurality of first touch electrodes Ty1 to Ty4 and a plurality of first fingerprint touch electrodes Fx1 to Fx7. The first touch electrodes Ty1 to Ty4 may have, for example, a rectangular shape and are arranged in a first direction (for example, x-axis direction). The first fingerprint touch electrodes Fx1 to Fx7 may have a bar shape, for example, a stripe shape. The first fingerprint touch electrodes Fx1 to Fx7 are arranged in the first direction to overlap the first touch electrodes Ty1 to Ty4 with an insulating layer interposed between them.

The fingerprint sensor FS includes a plurality of first fingerprint touch electrodes Fx1 to Fx7 and a plurality of second fingerprint touch electrodes Fy1 to Fy10 that intersect each other. The first fingerprint touch electrodes Fx1 to Fx7 are arranged in parallel with one another in the first direction. The second fingerprint touch electrodes Fy1 to Fy10 are arranged in parallel with one another in the second direction to intersect the first fingerprint touch electrodes Fx1 to Fx7.

The first touch electrodes Ty1 to Ty4 and the first fingerprint touch electrodes Fx1 to Fx7 are electrically insulated from each other by insulating patterns (not shown) or an insulating layer (not shown). The first fingerprint touch electrodes Fx1 to Fx7 and the second fingerprint touch electrodes Fy1 to Fy10 are electrically insulated from each other by insulating patterns (not shown) or an insulating layer (not shown).

The first fingerprint touch electrodes Fx1 to Fx7 are connected to the fingerprint touch IC FTIC mounted on the second flexible circuit board FPC2 through a plurality of first fingerprint routing wires FxW1 to FxW7. The second fingerprint touch electrodes Fy1 to Fy10 are connected to the fingerprint touch IC FTIC mounted on the second flexible circuit board FPC2 through a plurality of second fingerprint routing wires FyW1 to FyW10.

The plurality of first fingerprint touch electrodes Fx1 to Fx7 and the plurality of second fingerprint touch electrodes Fy1 to Fy10 may be made of a transparent conductive material, for example, indium tin oxide (ITO), indium zinc oxide (IZO), and gallium-doped zinc oxide (GZO). The insulating layer or the insulating pattern may be formed using an inorganic insulating material, such as silicon oxide and silicon nitride, or a photosensitive organic insulating material, for example, PAC.

The second fingerprint touch electrodes Fy1 to Fy10 constituting the fingerprint sensor FS of the fingerprint touch sensor FTS are disposed only in a portion of the sensor screen SS corresponding to the second display area DA2, and the first touch electrodes Ty1 to Ty4 constituting the second touch sensors TS1 to TS4 of the fingerprint touch sensor FTS are disposed in a remaining portion of the sensor screen SS corresponding to the second display area DA2.

A pitch of the first fingerprint touch electrodes Fx1 to Fx7 and the second fingerprint touch electrodes Fy1 to Fy10 may be about 50 μm to 100 μm, and a width of each electrode may be about 5 μm to 50 μm. Each of the first touch electrodes Ty1 to Ty4 may have a rectangular shape, of which a length of each side is about 3 to 5 mm. Unlike this, each of the first touch electrodes Ty1 to Ty4 may have the same pitch and the same length as the first fingerprint touch electrodes Fx1 to Fx7. In this instance, the routing wires respectively connected to the first touch electrodes Ty1 to Ty4 may be grouped and connected, thereby serving as a touch sensor.

In an example of FIG. 10, the odd-numbered first fingerprint routing wires FxW1, FxW3, FxW5, and FxW7 and the even-numbered first fingerprint routing wires FxW2, FxW4, and FxW6 are disposed on both sides of the second display area DA2 and are respectively connected to one ends of the odd-numbered first fingerprint touch electrodes Fx1, Fx3, Fx5, and Fx7 and the other ends of the even-numbered first fingerprint touch electrodes Fx2, Fx4, and Fx6. However, embodiments are not limited thereto. For example, all of the first fingerprint routing wires FxW1 to FxW7 may be disposed on one side of the second display area DA2 and may be respectively connected to one ends or the other ends of the first fingerprint touch electrodes Fx1 to Fx7. For example, some (e.g., FxW1 to FxW3) of the first fingerprint routing wires FxW1 to FxW7 may be respectively connected to one ends of some (e.g., Fx1 to Fx3) of the first fingerprint touch electrodes Fx1 to Fx7, and remaining first fingerprint routing wires (e.g., FxW4 to FxW7) may be respectively connected to the other ends of the remaining first fingerprint touch electrodes (e.g., Fx4 to Fx7).

The fingerprint touch IC FTIC supplies a driving pulse to the first fingerprint touch electrodes Fx1 to Fx7 and senses the second fingerprint touch electrodes Fy1 to Fy10 and the first touch electrodes Ty1 to Ty4, thereby sensing changes in a capacitance resulting from a touch input. Hence, when a touch input using a finger is performed on a formation area of the first touch electrodes Ty1 to Ty4, the fingerprint touch IC FTIC may recognize the touch input. Further, when a touch input using the finger is performed on a formation area of the fingerprint sensor FS, the fingerprint touch IC FTIC may sense changes in a capacitance between ridges and valleys of a fingerprint resulting from the touch input and thus may recognize the fingerprint of the user.

Figure 11:
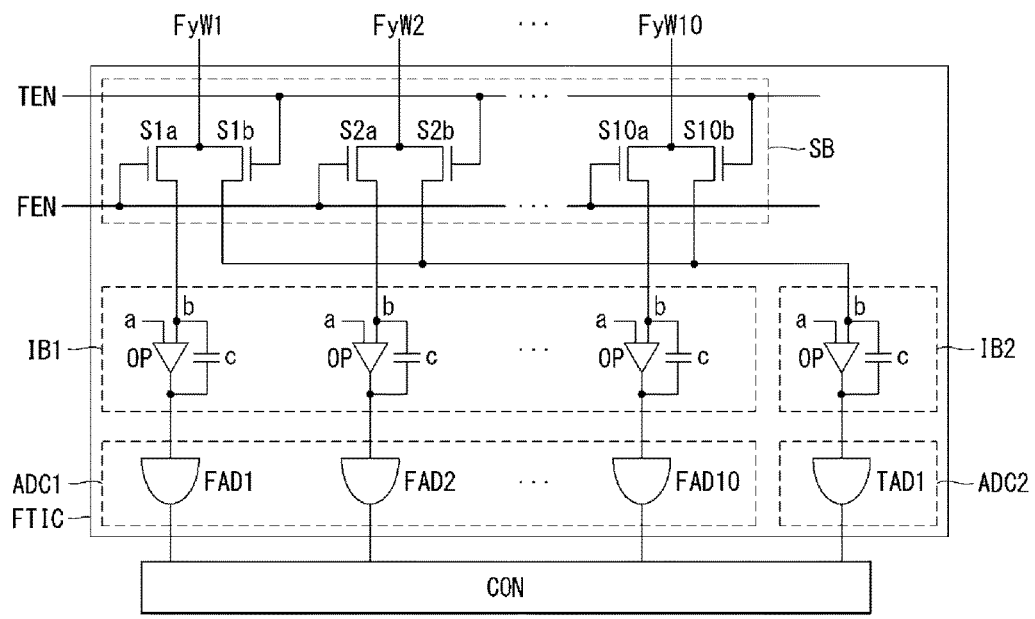
FIG. 11 is a block diagram illustrating a partial configuration of a fingerprint touch IC shown in FIG. 10.
Figure 12:
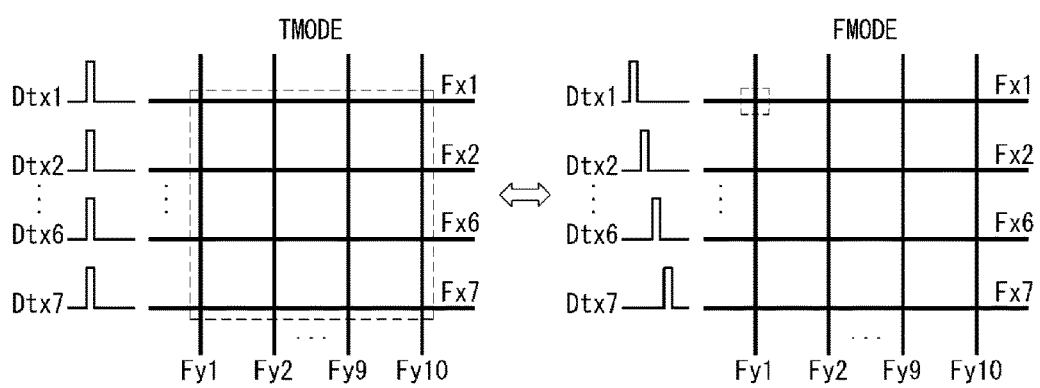
FIG. 12 is a waveform diagram illustrating a drive timing of a fingerprint sensor shown in FIG. 10 in each of a touch mode and a fingerprint mode.

FIG. 11 is a block diagram illustrating a partial configuration of the fingerprint touch IC shown in FIG. 10. FIG. 12 is a waveform diagram illustrating a drive timing of the fingerprint sensor shown in FIG. 10 in each of a touch mode and a fingerprint mode. With reference to FIGS. 11 and 12, fingerprint recognition and touch recognition in a formation area of the fingerprint sensor FS are described in detail below.

Referring to FIG. 11, the fingerprint touch IC FTIC includes a switching block SB, a first integration block IB1 connected to the second fingerprint routing wires FyW1 to FyW10 through the switching block SB, a second integration block IB2 connected to one line, forming the second fingerprint routing wires FyW1 to FyW10 as a group, through the switching block SB, a first analog-to-digital converter ADC1 connected to an output unit of the first integration block IB1, and a second analog-to-digital converter ADC2 connected to an output unit of the second integration block IB2.

The switching block SB includes a first group of switching elements S1a to S10a and a second group of switching elements S1b to S10b.

The first group of switching elements S1a to S10a are turned on in response to a fingerprint enable signal FEN and supply a sensing signal transmitted from the second fingerprint routing wires FyW1 to FyW10 to the first integration block IB1. The second group of switching elements S1b to S10b are turned on in response to a touch enable signal TEN and supply a sensing signal transmitted from the second fingerprint routing wires FyW1 to FyW10 to the second integration block IB2. The fingerprint enable signal FEN and the touch enable signal TEN are in antiphase. Therefore, when the first group of switching elements S1a to S10a are turned on, the second group of switching elements S1b to S10b are turned off. On the contrary, when the second group of switching elements S1b to S10b are turned on, the first group of switching elements S1a to S10a are turned off. The timing controller 16 may generate the fingerprint enable signal FEN and the touch enable signal TEN based on the touch sync signal Tsync.

The first integration block IB1 includes integrators that respectively integrate analog sensing voltages received from the second fingerprint routing wires FyW1 to FyW10 through the switching block SB. Each integrator of the first integration block IB1 includes an operational amplifier OP and a capacitor C. The operational amplifier OP includes a first input terminal "a" connected to a reference voltage source Vref, a second input terminal "b" connected to one of the second fingerprint routing wires FyW1 to FyW10, and an output terminal. The capacitor C is connected between the second input terminal "b" and the output terminal of the operational amplifier OP and accumulates the analog sensing voltages.

The second integration block IB2 includes an integrator that integrates analog sensing voltages received from the second fingerprint routing wires FyW1 to FyW10 through the switching block SB. The integrator of the second integration block IB2 includes an operational amplifier OP and a capacitor C. The operational amplifier OP includes a first input terminal "a" connected to the reference voltage source Vref, a second input terminal "b" commonly connected to the second fingerprint routing wires FyW1 to FyW10, and an output terminal. The capacitor C is connected between the second input terminal "b" and the output terminal of the operational amplifier OP and accumulates the analog sensing voltages.

The first analog-to-digital converter ADC1 includes a plurality of fingerprint analog-to-digital converters FAD1 to FAD10 that converts the analog sensing voltages from the first integration block IB1 into a digital signal (i.e., fingerprint sensing data). The second analog-to-digital converter ADC2 includes a touch analog-to-digital converter TAD that converts the analog sensing voltages from the second integration block IB2 into a digital signal (i.e., second touch sensing data).

As shown in FIG. 12, in a touch mode TMODE for a touch drive, the fingerprint touch IC FTIC simultaneously supplies driving pulses Dtx1 to Dtx7 to the first fingerprint touch electrodes Fx1 to Fx7 and groups the first fingerprint touch electrodes Fx1 to Fx7. Further, the fingerprint touch IC FTIC supplies the sensor controller CON with second touch sensing data obtained by sensing the second fingerprint touch electrodes Fy1 to Fy10 intersecting the grouped first fingerprint touch electrodes Fx1 to Fx7.

As shown in FIG. 12, in a fingerprint mode FMODE for a fingerprint drive, the fingerprint touch IC FTIC sequentially supplies the driving pulses Dtx1 to Dtx7 to the first fingerprint touch electrodes Fx1 to Fx7 and individually drives the first fingerprint touch electrodes Fx1 to Fx7. Further, the fingerprint touch IC FTIC supplies the sensor controller CON with second fingerprint sensing data obtained by sensing the second fingerprint touch electrodes Fy1 to Fy10 intersecting the individually driven first fingerprint touch electrodes Fx1 to Fx7.

Figure 13:
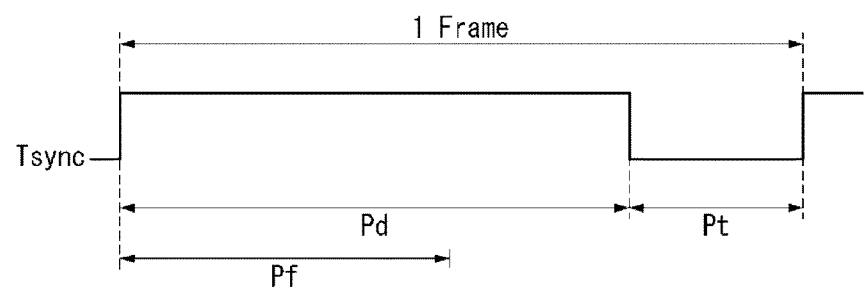
FIGS. 13 and 14 illustrate a driving method for increasing sensitivity of a fingerprint sensor.
Figure 14:
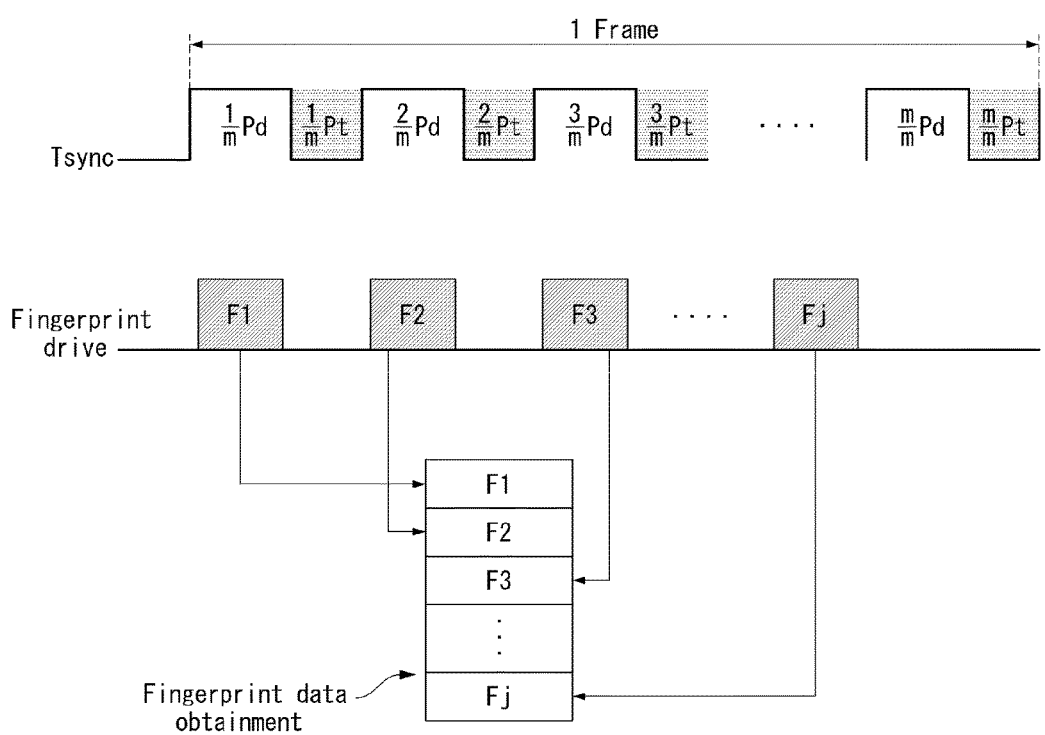
Figure 15:
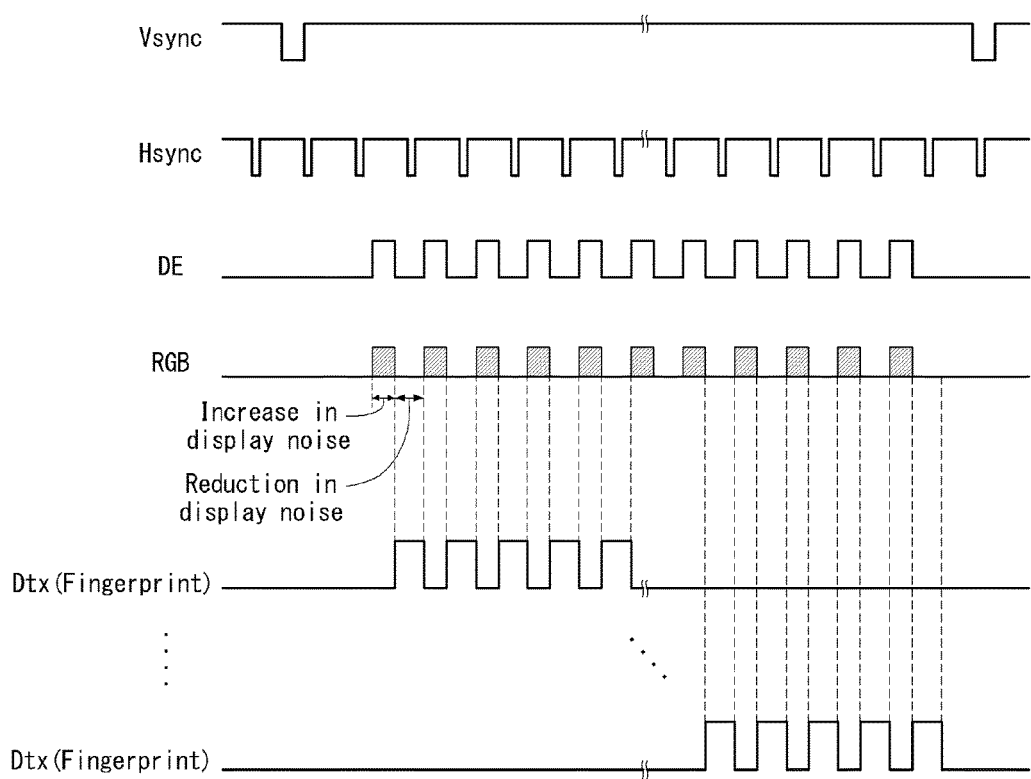
FIG. 15 is a waveform diagram illustrating a detailed drive timing of a fingerprint sensor in accordance with a driving method of FIGS. 13 and 14.

FIGS. 13 and 14 illustrate a driving method for increasing sensitivity of a fingerprint sensor. FIG. 15 is a waveform diagram illustrating a detailed drive timing of a fingerprint sensor in accordance with the driving method of FIGS. 13 and 14.

The timing controller 16 may time-divide one frame period into at least one touch period Pt, in which a touch input of the first display area DA1 is sensed, and at least one display period Pd, in which input image data RGB is written to the first and second display areas DA1 and DA2, based on the touch sync signal Tsync.

In order to minimize a parasitic capacitance between the first touch sensors TS of the first display area DA1 and the signal lines D1 to Dm and G1 to Gn connected to the pixels during the touch period Pt, the AC signal Vac having the same phase and the same amplitude as the touch driving signal Tdrv is supplied to the signal lines D1 to Dm and G1 to Gn. This is referred to as a load free drive. During the touch period Pt, voltages of the signal lines D1 to Dm and G1 to Gn continuously swing due to the load free drive. The voltage swing affects the fingerprint touch sensor FTS on the sensor screen SS as a touch noise. Thus, during the touch period Pt, the fingerprint sensing may be impossible because of the touch noise. The touch noise may include various types of touch noises as well as a load free driving noise.

In order to avoid the touch noise in the fingerprint sensing, as shown in FIG. 13, the fingerprint touch IC FTIC may provide a fingerprint period Pf, in which the first touch sensors TS are not driven, in the display period Pd of one frame period and may selectively drive the fingerprint sensor and the second touch sensors included in the fingerprint touch sensor FTS in the fingerprint period Pf of the display period Pd.

More specifically, each time the data enable signal DE has a high logic level in the display period Pd, the writing of the input image data RGB is performed. When the input image data RGB is written, the voltages of the signal lines D1 to Dm and G1 to Gn swing. Therefore, the voltage swing may affect the fingerprint sensing as a display noise. Hence, the fingerprint touch IC FTIC may set a predetermined period, in which the writing of the input image data RGB is stopped, in the display period Pd as the fingerprint period Pf and may selectively drive the fingerprint sensor and the second touch sensors included in the fingerprint touch sensor FTS in each fingerprint period Pf of the display period Pd.

As shown in FIG. 14, when a plurality of display periods 1Pd/m to mPd/m and a plurality of touch periods 1Pt/m to mPt/m are assigned to one frame period, a plurality of fingerprint periods may be assigned corresponding to the plurality of display periods 1Pd/m to mPd/m. In this instance, the fingerprint touch IC FTIC may accumulate a result of the sensing of the fingerprint input of the sensor screen SS many times (F1 to Fj) and thus may increase the accuracy of the fingerprint sensing.

Because the fingerprint period Pf is a period in which the writing of the input image data RGB is stopped in the display period Pd, the fingerprint period Pf may be selected as a period, in which the data enable signal DE has a low logic level, as shown in FIG. 15.

In order to sufficiently obtain fingerprint sensing data, a driving pulse Dtx for driving the fingerprint sensor may be repeatedly applied to each of the first fingerprint touch electrodes of the fingerprint touch sensor FTS many times in the fingerprint period Pf. The first fingerprint touch electrodes may be sequentially driven by the driving pulse Dtx, which is repeatedly applied many times.

Figure 16:
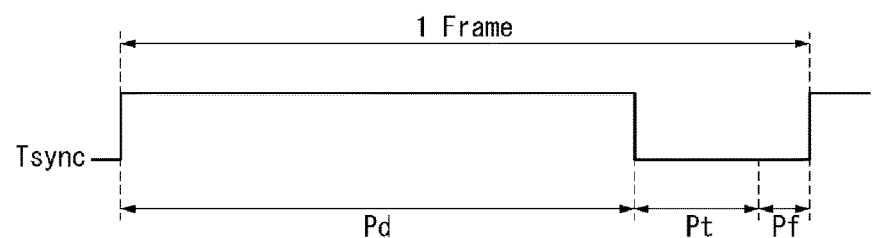
FIGS. 16 to 18 illustrate another driving method for increasing sensitivity of a fingerprint sensor.
Figure 17:
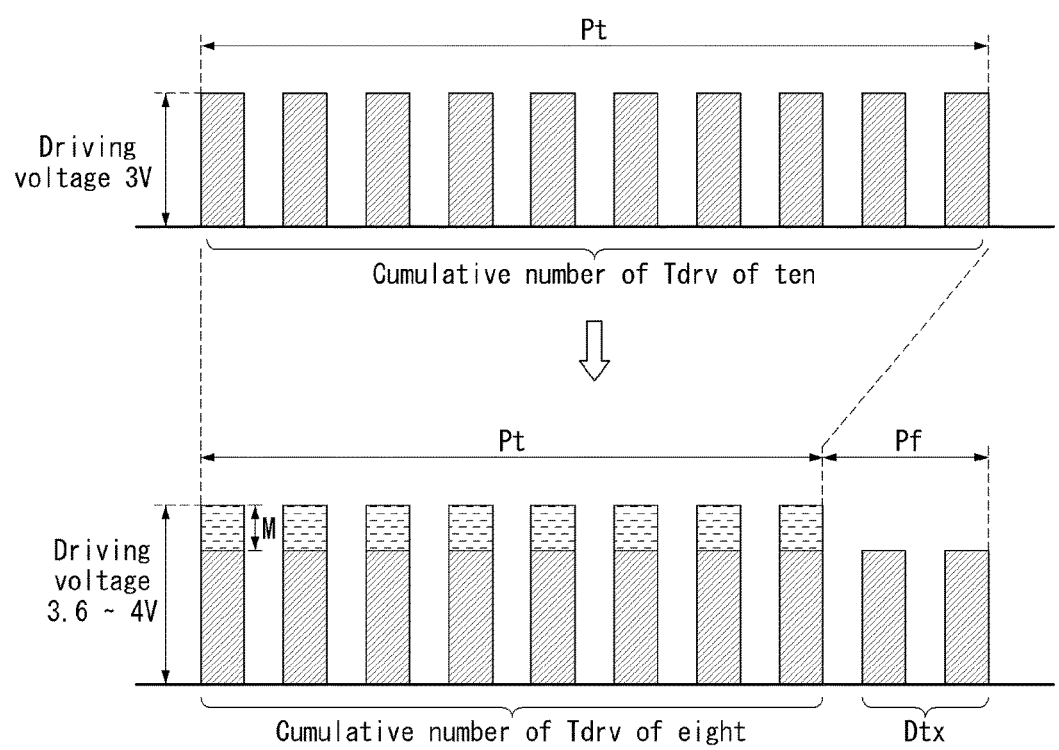
Figure 18:
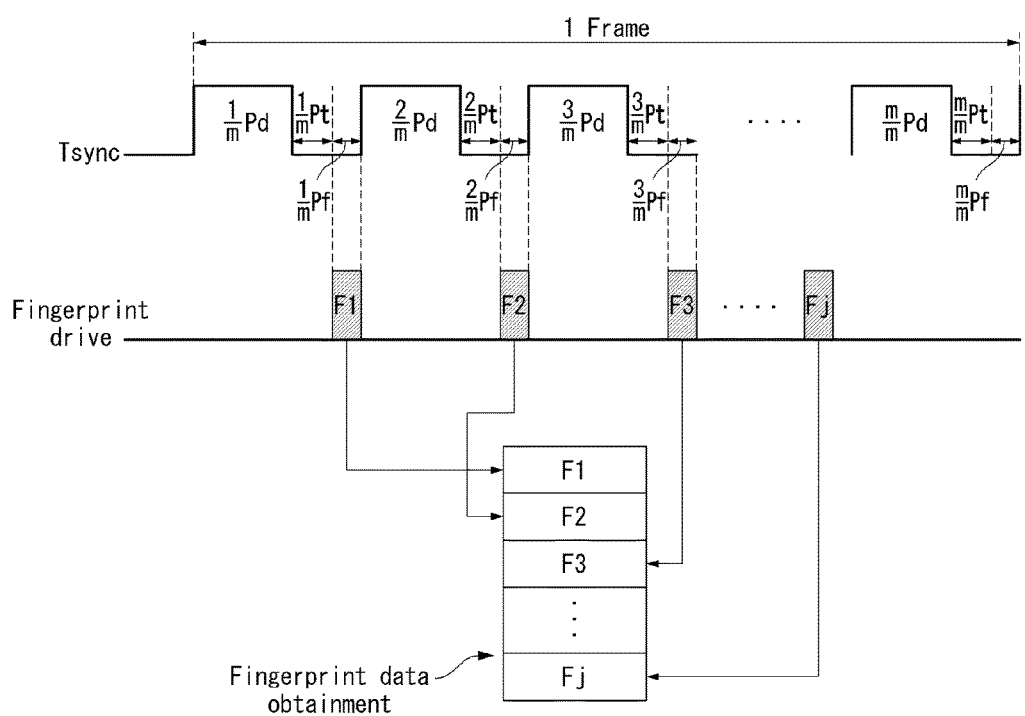

FIGS. 16 to 18 illustrate another driving method for increasing sensitivity of a fingerprint sensor.

Referring to FIG. 16, the timing controller 16 may time-divide one frame period into at least one touch period Pt in which a touch input of the first display area DA1 is sensed, at least one display period Pd in which input image data RGB is written to the first and second display areas DA1 and DA2, and at least one fingerprint period Pf in which a fingerprint input of the sensor screen SS is sensed, based on the touch sync signal Tsync.

In order to avoid a touch noise in the fingerprint sensing, as shown in FIG. 16, the fingerprint touch IC FTIC may separately provide the fingerprint period Pf, in which the first touch sensors TS are not driven, in one frame period and may selectively drive the fingerprint sensor and the second touch sensors included in the fingerprint touch sensor FTS in the fingerprint period Pf.

The sensitivity of the touch sensing is proportional to the application number and a voltage level of the touch driving signal Tdrv. In order to separately provide the fingerprint period Pf in a fixed duration of one frame period, as shown in FIG. 17, the application number of the touch driving signals Tdrv may be set to be less than a default value (for example, ten), and instead the voltage level of the touch driving signal Tdrv may be set to be greater than a default value (for example, 3V).

As shown in FIG. 18, when a plurality of display periods 1Pd/m to mPd/m and a plurality of touch periods 1Pt/m to mPt/m are assigned to one frame period, a plurality of fingerprint periods 1Pf/m to mPf/m may be assigned corresponding to the plurality of display periods 1Pd/m to mPd/m and the plurality of touch periods 1Pt/m to mPt/m. In this instance, the fingerprint touch IC FTIC may accumulate a result of the sensing of the fingerprint input of the sensor screen SS many times (F1 to Fj) and thus may increase the accuracy of the fingerprint sensing.

As described above, the embodiments are configured such that the sensor screen including the two transparent substrates and the fingerprint sensor between the two transparent substrates is disposed on the display panel, thereby reducing a distance between the fingerprint sensor and the finger. Hence, the embodiments can increase the sensing accuracy and the fingerprint recognition rate.

The embodiments drive the fingerprint sensor and the second touch sensor on the sensor screen in a portion of one frame period, in which the touch sensors embedded in the display panel are not driven, thereby minimizing the mixing of the noise. Hence, the embodiments can increase the sensing accuracy and the fingerprint recognition rate.

It will be apparent to those skilled in the art that various modifications and variations can be made in the present invention without departing from the spirit or scope of the invention. Thus, it is intended that the present invention cover the modifications and variations of this invention provided they come within the scope of the appended claims and their equivalents.

What is claimed is:

1. A display device, comprising:
   a display panel including a first display area and a second display area that are adjacent to each other, the display panel including a first touch sensor disposed in the first display area;
   a sensor screen disposed on the display panel, the sensor screen including a fingerprint sensor and a second touch sensor at a location corresponding to the second display area of the display panel;
   a display touch integrated circuit (IC) configured to drive:
   pixels of the first and second display areas during a display period included in one frame period; and
   the first touch sensor during a touch period included in the one frame period; and
   a fingerprint touch IC configured to:
   drive the fingerprint sensor in a portion of the one frame period, in which the first touch sensor is not driven; and
   drive the second touch sensor in the portion of the one frame period, in which the first touch sensor is not driven,
   wherein the sensor screen includes a first transparent substrate and a second transparent substrate that are sequentially disposed on the display panel, and
   wherein the fingerprint sensor and the second touch sensor are between the first transparent substrate and the second transparent substrate.

2. The display device of claim 1, further comprising:
   a timing controller configured to time-divide the one frame period into at least the one touch period in which a touch input of the first display area is sensed, and at least the one display period in which input image data is written to the first and second display areas, based on a touch sync signal,
   wherein the fingerprint touch IC drives the fingerprint sensor in the display period.

3. The display device of claim 2, wherein the fingerprint touch IC drives the fingerprint sensor in each predetermined portion of the display period, in which the writing of the input image data is stopped.

4. The display device of claim 3, wherein, in the predetermined portion of the display period, a data enable signal has a low logic level.

5. The display device of claim 1, wherein the fingerprint touch IC selectively drives the fingerprint sensor and the second touch sensor in the portion of the one frame period, in which the first touch sensor is not driven.

6. The display device of claim 1, further comprising:
   a timing controller configured to time-divide the one frame period into at least one touch period in which a touch input of the first display area is sensed, at least the one display period in which input image data is written to the first and second display areas, and at least one fingerprint period in which a fingerprint input of the sensor screen is sensed, based on a touch sync signal,
   wherein the fingerprint touch IC drives the fingerprint sensor in the fingerprint period.

7. The display device of claim 6, wherein the fingerprint touch IC drives the second touch sensor in the display period.

8. The display device of claim 1, wherein the fingerprint touch IC accumulates a result of sensing of a fingerprint input of the sensor screen multiple times.

9. The display device of claim 1, wherein a thickness of the first transparent substrate is greater than a thickness of the second transparent substrate.

10. The display device of claim 1, wherein:
    the fingerprint sensor is disposed in a portion of the sensor screen corresponding to the second display area to sense a fingerprint input and a touch input; and
    the second touch sensor is disposed in a remaining portion of the sensor screen corresponding to the second display area.

11. The display device of claim 1, wherein the first touch sensor is one of a self-capacitive touch sensor and a mutual capacitance touch sensor formed by patterning a common electrode of the display panel.

12. A method of driving a display device including a display panel including a first display area and a second display area, that are adjacent to each other, and a first touch sensor disposed in the first display area and a sensor screen disposed on the display panel and including a fingerprint sensor and a second touch sensor at a location corresponding to the second display area of the display panel, the method comprising:
    driving pixels of the first and second display areas during a display period included in one frame period to write input image data to the display panel;
    driving the first touch sensor during a touch period included in one frame period to obtain a first touch sensing value from the first touch sensor;
    driving the fingerprint sensor in a portion of the one frame period, in which the first touch sensor is not driven, to obtain a fingerprint sensing value; and
    driving the second touch sensor in the portion of the one frame period, in which the first touch sensor is not driven, to obtain a second touch sensing value,
    wherein the sensor screen includes a first transparent substrate and a second transparent substrate that are sequentially disposed on the display panel, and
    wherein the fingerprint sensor and the second touch sensor are between the first transparent substrate and the second transparent substrate.

13. The method of claim 12, further comprising time-dividing the one frame period into at least the one touch period in which a touch input of the first display area is sensed, and at least the one display period in which the input image data is written to the first and second display areas, based on a touch sync signal.

14. The method of claim 13, wherein the obtaining of the fingerprint sensing value or the second touch sensing value includes selectively driving the fingerprint sensor and the second touch sensor in the display period.

15. The method of claim 13, wherein the obtaining of the fingerprint sensing value includes driving the fingerprint sensor in each predetermined portion of the display period, in which the writing of the input image data is stopped.

16. The method of claim 15, wherein, in the predetermined portion of the display period, a data enable signal has a low logic level.

17. The method of claim 12, further comprising:
time-dividing the one frame period into one touch period in which a touch input of the first display area is sensed, at least the one display period in which the input image data is written to the first and second display areas, and at least one fingerprint period in which a fingerprint input of the sensor screen is sensed, based on a touch sync signal,
wherein the obtaining of the fingerprint sensing value includes driving the fingerprint sensor in the fingerprint period.

18. The method of claim 12, wherein the obtaining of the second touch sensing value includes driving the second touch sensor in the display period.

19. The method of claim 12, wherein the obtaining of the fingerprint sensing value includes accumulating a result of sensing of a fingerprint input of the sensor screen multiple times.

* * * * *